US008335293B1

(12) United States Patent
Eom et al.

(10) Patent No.: US 8,335,293 B1
(45) Date of Patent: Dec. 18, 2012

(54) NUCLEAR FUEL GRID ASSEMBLY WITH HYDRAULICALLY BALANCED MIXING VANE PATTERN

(75) Inventors: Kyong-Bo Eom, Yuseong-gu (KR); Kyu-Tae Kim, Yuseong-gu (KR); Jung-Min Suh, Yuseong-gu (KR); Nam-Gyu Park, Yuseong-gu (KR); Joon-Kyoo Park, Yuseong-gu (KR); Jin-Sun Kim, Seo-gu (KR); Dong-Geun Ha, Yuseong-gu (KR); Kyoung-Joo Kim, Yuseong-gu (KR); Il-Kyu Kim, Yuseong-gu (KR); Seong-Ki Lee, Yuseong-gu (KR); Jin-Seok Lee, Yuseong-gu (KR); Kang-Hoon Kim, Yuseong-gu (KR); Sung-Kew Park, Yuseong-gu (KR); Kyeong-Lak Jeon, Seo-gu (KR)

(73) Assignee: Korea Nuclear Fuel Co., Ltd., Daejeon (KR)

( * ) Notice: Subject to any disclaimer, the term of this patent is extended or adjusted under 35 U.S.C. 154(b) by 867 days.

(21) Appl. No.: 12/434,985

(22) Filed: May 4, 2009

(30) Foreign Application Priority Data

Dec. 26, 2008 (KR) .................. 10-2008-0134519

(51) Int. Cl.
*G21C 3/34* (2006.01)
(52) U.S. Cl. ........ 376/439; 376/443; 376/438; 376/434; 376/442

(58) Field of Classification Search .................. 376/439, 376/443, 438, 434, 442
See application file for complete search history.

(56) References Cited

U.S. PATENT DOCUMENTS

| 5,515,408 | A | * | 5/1996 | Oyama et al. | ................. 376/434 |
| 6,606,369 | B1 | * | 8/2003 | Smith et al. | .................... 376/438 |
| 2003/0053584 | A1 | * | 3/2003 | Chun et al. | ...................... 376/439 |

OTHER PUBLICATIONS

Merriam-Webster's Collegiate Dictionary, Tenth Edition, 1993, p. 1292.*

* cited by examiner

*Primary Examiner* — Jack W Keith
(74) *Attorney, Agent, or Firm* — Rabin & Berdo, P.C.

(57) ABSTRACT

Disclosed is a spacer grid assembly with mixing vanes supporting fuel rods of nuclear fuel assemblies and mixing coolant that flows around the fuel rods, and more particularly, a spacer grid equipped with mixing vanes that mix coolant flowing around fuel rods.

The spacer grid with hydraulically balanced mixing vane patterns, in the spacer grid equipped with a strip dividing a plurality of unit grid cells and a plurality of springs, protruded in uniform directions of vertical and horizontal directions on a grid surface of the strip and supporting nuclear fuel rods, which includes: a plurality of mixing vanes protruded to the downstream of coolant on an upper end of the inner grid surface, wherein positions and directions of the mixing vanes are formed in regular patterns on the spacer grid. Thus, it can minimize coolant flow induced vibration of the spacer grid by balancing hydraulic load generated by the mixing vanes, around the center of the spacer grids.

1 Claim, 7 Drawing Sheets

NUCLEAR FUEL GRID ASSEMBLY WITH HYDRAULICALLY BALANCED MIXING VANE PATTERN

CROSS-REFERENCE TO RELATED APPLICATION

This application claims priority to Korean Patent Application No. 10-2008-0134519 filed on Dec. 26, 2008, which is hereby incorporated by reference in its entirety.

CLAIM FOR PRIORITY

This application is based on and claims priority to Korean Patent Application No. 10-2008-0134519 filed on Dec. 26, 2008, in the Korean Intellectual Property Office (KIPO), the entire contents of which are hereby incorporated by reference.

BACKGROUND

1. Field of the Invention

The present invention relates to a spacer grid supporting fuel rods of a nuclear fuel assembly, and more particularly, to spacer grid assembly equipped with a mixing vane mixing coolant that flows around fuel rods.

2. Description of the Related Art

A nuclear reactor is a device in which nuclear chain reactions of nuclear fission materials are artificially controlled to achieve several purposes such as generating heat, producing radioisotopes and plutonium, or forming radiation fields.

Generally, a light water reactor uses uranium enriched to about 2-5% Uranium-235. The uranium is fabricated as a cylindrical pellet weighing about 5 g for to process as nuclear fuel used in a nuclear reactor.

The pellets are bundled by hundreds together and inserted into a Zircaloy cladding tube in a vacuum, and an upper end cap is welded after insertion of spring and helium gas into the tube to manufacture a fuel rod. Finally, the fuel rod is burned through nuclear reaction in the nuclear reactor by forming a nuclear fuel assembly.

The nuclear fuel assembly and their elements are shown in FIGS. 1 to 3.

FIG. 1 is a schematic diagram illustrating a general nuclear fuel assembly, FIG. 2 is a plan view illustrating a spacer grid seen from above, and FIG. 3 is an exploded perspective view illustrating the spacer grid in detail.

Referring to FIG. 1, the nuclear fuel assembly includes a body formed with an upper end fitting 1, a lower end fitting 5, a guide tube 2 and a spacer grid 4, and a fuel rod 3 supported by a spring 6 (see FIG. 3) and a dimple 7 (see FIG. 3), inserted and formed inside the spacer grid 4.

To prevent scratch on the surface of the fuel rod 3 and damage to the spring 6 inside the spacer grid in the event of assembling a fuel assembly, the surface of the fuel rod 3 is painted with lacquer and the fuel rod 3 is inserted into a skeletal structure, then, the upper and lower end fittings 1 and 5 are attached and fixed thereto, finally, the assembling of the nuclear fuel assembly is completed. Then, after the assembly, a manufacturing process of the assembly is completed by checking intervals between fuel rods, distortion, total length, size, etc., after removal of the lacquer from the completed assembly.

Referring to FIGS. 2 and 3, the spacer grid 4 is formed in a grid shape by mutually engaging slots (not shown) on which each strip (a thin metal plate) is formed at regular intervals to divide space portions for insertion of each of a plurality of fuel rods 3.

The spacer grid 4 is arranged in number of 10 to 13 up and down and welded to the guide tube 2 having a length of 4 m. The spring 6 and the dimple 7 are regularly formed in each space portion that is divided by the spacer grid 4. The spring 6 and the dimple 7 are contacted to the fuel rod 3 (see FIG. 1) to maintain the interval of the fuel rods 3 (see FIG. 1), arrange the fuel rods 3 at determined positions and fix the fuel rod 3 due to elasticity of the spring 6.

Moreover, the spacer grid 4 is equipped with a plurality of mixing vanes 8 (see FIGS. 2 and 3) that integrated to the strips inside, protruded to downstream of coolant flow and bent for surrounding the fuel rod 3 to promote heat transfer caused by mixing coolant around the fuel rod 3.

Recently, development of nuclear fuel has been focused on high combustion efficiency and no defect. One of important obstacles that interfere with high-combustion efficiency is the phenomenon that is commonly referred to as DNB (departure from nuclear boiling). The DNB is affected by interval of nuclear fuel rods, pressure of a nuclear reactor system, heat flux, and coolant enthalpy and coolant velocity.

When the DNB is generated, a gaseous film is formed on the surface of the fuel rod in a corresponding portion. Then, due to decrease of heat transfer, the temperature of the fuel rods rapidly increases. If the state is maintained, finally, the fuel rods are damaged.

Accordingly, the nuclear reactor must be operated at a heat flux level lower than that at which the DNB occurs. This margin is referred to as "thermal margin".

The nuclear reactor normally has regions of special-higher neutron flux or power density than other regions. One of factors that can cause the regions is a control rod channel for insertion of a control rod. When the control rod is withdrawn from the control rod channel, the space is filled with coolant that is a moderator. Thus, it increases efficiency of local moderating capacity and thereby increases power generated by adjacent fuel rods.

These regions having the high power density are hot channels having a higher rate of enthalpy than other channels. The hot channels limit the maximum operation conditions for the nuclear reactor and amount of power, since the channels reach the critical thermal margin first in comparison with other channels.

Conventional nuclear fuels have attempted to reduce variation of power density inside the nuclear reactor and improve the performance related to the DNB by providing the mixing vanes 8 integrated to the spacer grid 4, changing coolant flow and mixing coolant, thereby increasing heat transfer between the fuel rod 3 and the coolant.

The performance of the mixing vanes is affected by the size, shape, bend angle and position of the mixing vanes. The mixing vanes are so effective in regions of the hot channels in positions of fuel rods adjacent to positions of guide tubes for insertion of a control rod.

The conventional mixing vane has used the uniform coolant mixing vane pattern in the entire region of one spacer grid, or used a mixing vane pattern to be the same half image of the spacer grid as that of the rest half that is reflected on a mirror.

In a portion of the spacer grid coolant flow induced vibration is generated and thus it can cause fretting-wear of the fuel rod.

Hydraulic power generated by the mixing vanes is not balanced around the center of the spacer grid and thus it vibrates the spacer grid.

Accordingly, it has requested the spacer grid for improving performance related to the DNB and reducing vibration generated by the mixing vanes. In the U.S. Pat. No. 6,526,116 filed on Jul. 2, 1997, entitled "Nuclear Fuel Assembly with Hydraulically Balanced Mixing Vanes", as a part of the improvement, it was suggested a spacer grid to divide the entire region of the spacer grid regularly around the center of spacer grid at uniform angles and to have the uniform mixing vane pattern in each section. In addition, the hydraulically balanced spacer grid is formed by enabling the mixing vane pattern to be formed in a shape rotatable around the center of the spacer grid at uniform angle, thereby enabling the mixing vane pattern to be symmetrical around the center of the spacer grid.

However, as shown in FIG. 4 corresponding to FIG. 2 of U.S. Pat. No. 6,526,116, in case of a central shape of the spacer grid in the exemplary embodiment wherein the mixing vane pattern is applied to the spacer grid having an array of 17×17, it can balance hydraulic moment generated by the mixing vane in regions except for a central portion of the spacer grid. But, because the pattern of the mixing vane that is the most adjacent to the center of the spacer grid rotates in the same direction around the center of the spacer grid, hydraulic moment deflected to the center of the spacer grid is generated. Accordingly, it is difficult to maintain hydraulic balance of mixing vane patterns of all spacer grids perfectly.

FIG. 5 illustrates a feature of the central portion of the spacer grid of FIG. 2 wherein the same mixing vane pattern as same as described above is applied to the spacer grid having an array of 16×16. FIG. 5 shows a pattern wherein the hydraulic moment is unbalanced by mixing vanes since the mixing vane adjacent to the center of the spacer grid is arranged in a form to rotate in the same direction around the center of the spacer grid.

SUMMARY

Accordingly, an object of the present invention is to provide a spacer grid, equipped with a plurality of mixing vanes, protruded toward downstream of coolant from upper ends of inner surfaces of the spacer grid, that can maintain horizontal balance by arranging positions and directions of the mixing vanes in uniform patterns when facing an upper surface of the spacer grid, and by reducing coolant flow induced vibration generated in the spacer grid.

Additional advantages, objects and features of the invention will be set forth in part in the description which follows and in part will become apparent to those having ordinary skill in the art upon examination of the following or may be learned from practice of the invention.

According to an aspect of the present invention, there is provided a spacer grid with hydraulically balanced mixing vane patterns, in the spacer grid having a grid structure by intersected strips of nuclear fuel assemblies, which includes: a plurality of mixing vanes, integrated to inner strips inside the spacer grid, protruded to downstream of coolant flow, wherein positions and directions of the mixing vanes are formed in a pattern when facing to an upper plane of the spacer grid.

The pattern of the mixing vane is formed to be parallel to the standard lines with respect to each of two standard lines and enable the mixing vanes except for the mixing vane that is the most adjacent to the standard lines to be symmetrical to the standard lines, when two standard lines are defined in vertical and horizontal directions, which pass the center of the spacer grid and are perpendicular to each other.

According to an aspect of the present invention, there is provided a spacer grid with hydraulically balanced mixing vane patterns, in the spacer grid equipped with a strip dividing a plurality of unit grid cells and a plurality of springs, protruded to uniform direction of vertical and horizontal directions on grid planes of the strip and supporting nuclear fuel rods, which includes: a plurality of mixing vanes that are protruded to downstream of coolant from an upper end of an inner grid plane of the spacer grid, wherein positions and directions of the mixing vane are formed in uniform pattern on the spacer grid.

BRIEF DESCRIPTION OF THE DRAWINGS

The above and other objects, features and advantages of the present invention will be more apparent from the following detailed description taken in conjunction with the accompanying drawing, in which.

DETAILED DESCRIPTION OF EXEMPLARY EMBODIMENTS

Figure 1:
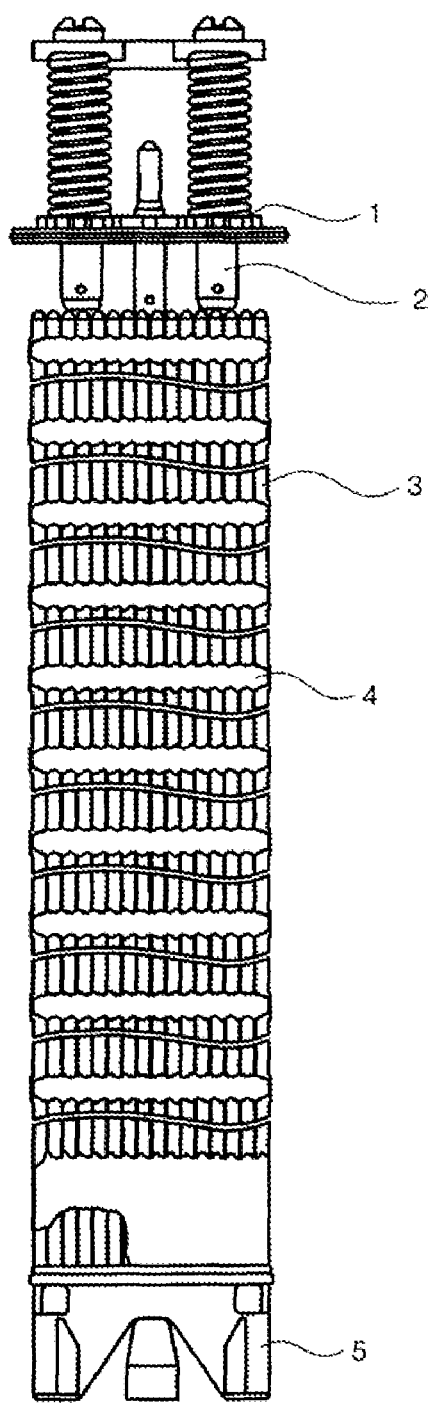
FIG. 1 is a schematic view illustrating a general nuclear fuel assembly.
Figure 2:
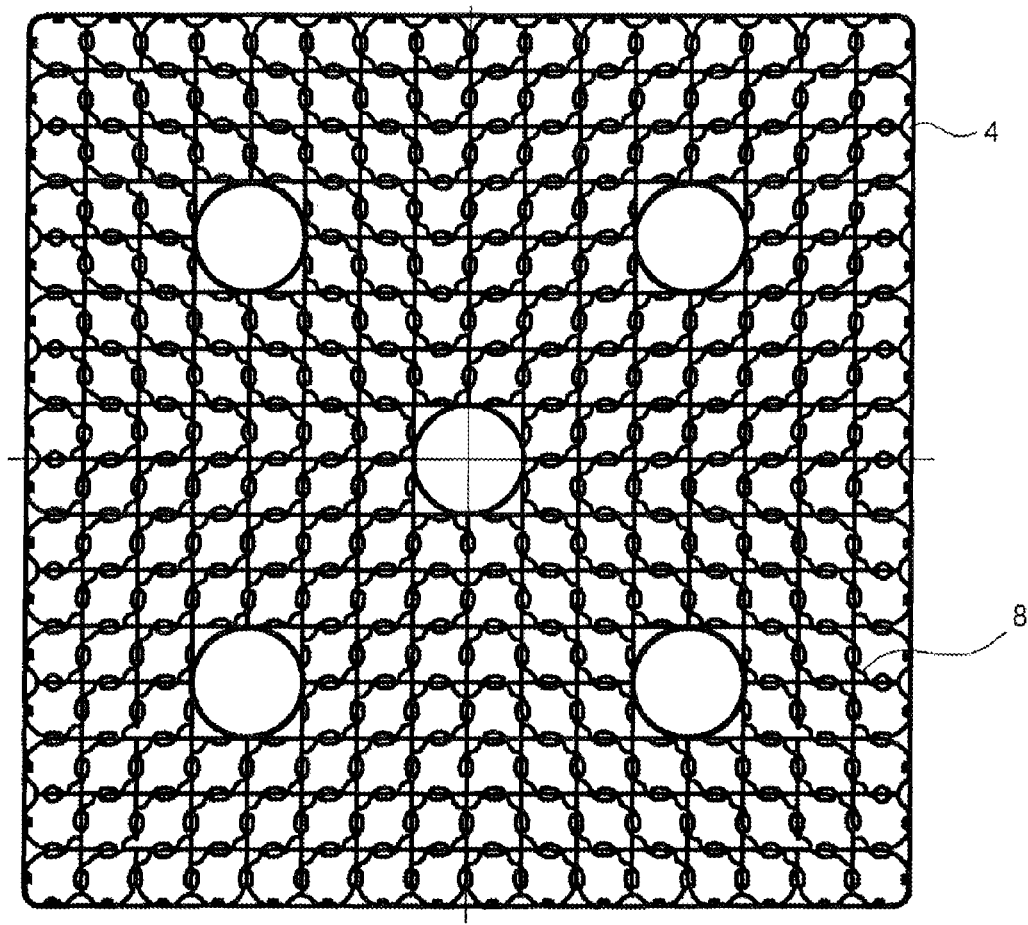
FIG. 2 is a plan view illustrating a general spacer grid.

Hereinafter, preferred embodiments of the present invention will be described in detail with reference to the accompanying drawing. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Each space portion divided by a grid structure of a spacer grid is referred to as a unit grid cell and one surface inside the grid cell is referred to as a grid surface. In addition, if one grid surface is defined as a vertical direction, all grid surfaces parallel thereto are referred to as vertical grid surfaces and grid surfaces perpendicular to the vertical grid surfaces are referred to as horizontal grid surfaces. Moreover, an axial direction is referred to as a direction to which a nuclear fuel rod is inserted, as a longitudinal direction of the unit grid cell.

Figure 3:
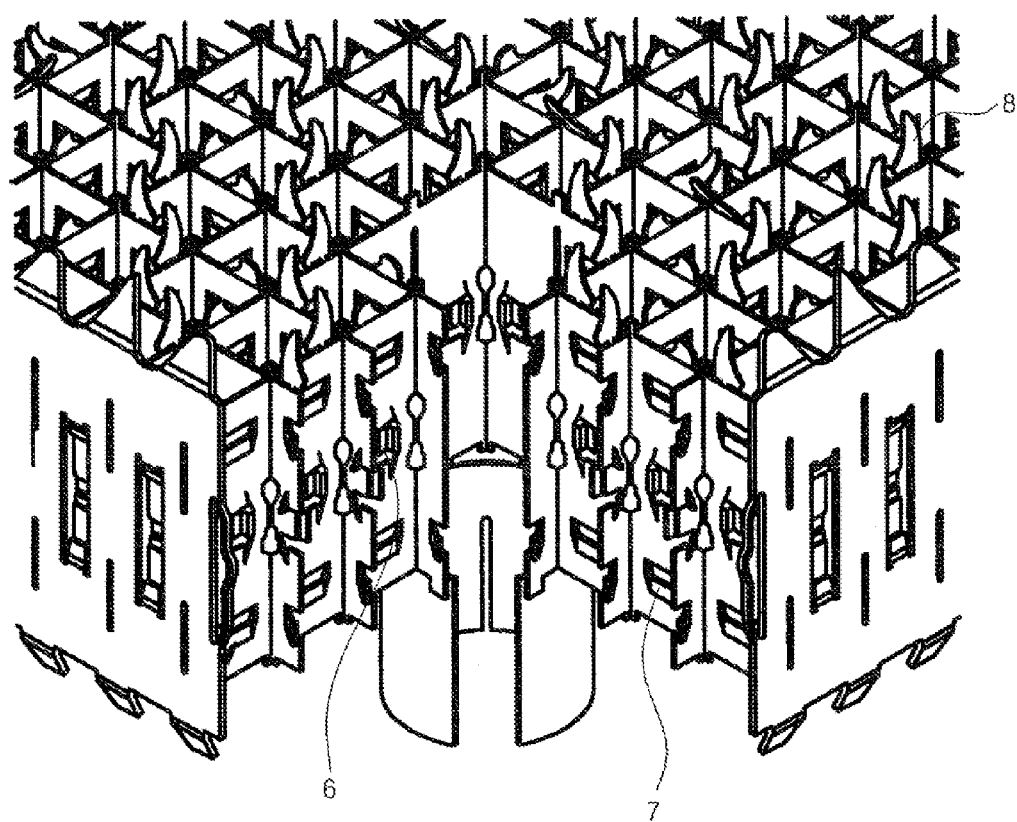
FIG. 3 is an exploded perspective view illustrating the general spacer grid.
Figure 4:
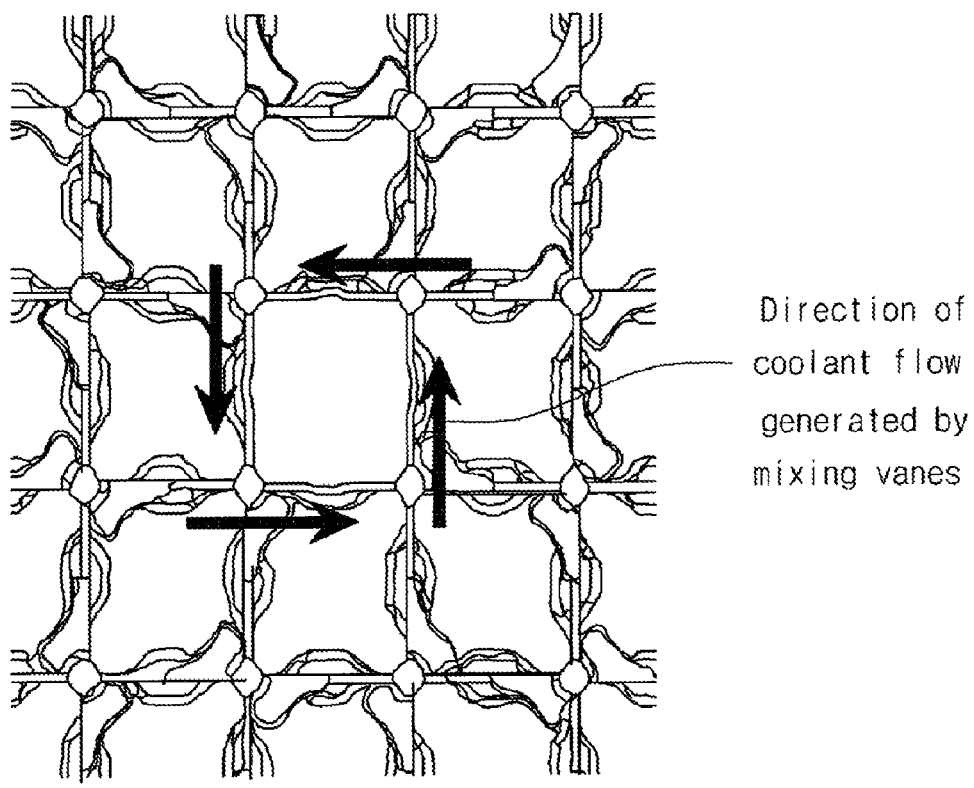
FIG. 4 is a plan view illustrating a central portion of a spacer grid having an array of 17×17 with conventional mixing vanes.
Figure 5:
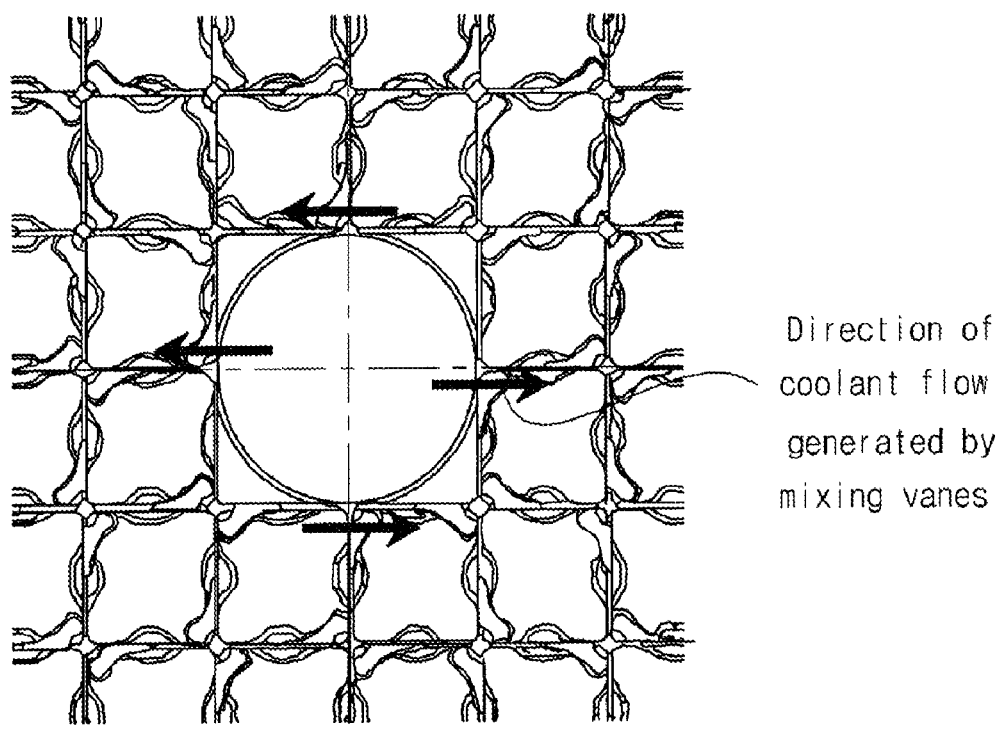
FIG. 5 is a plan view illustrating a central portion of a spacer grid having an array of 16×16 with conventional mixing vanes.
Figure 6:
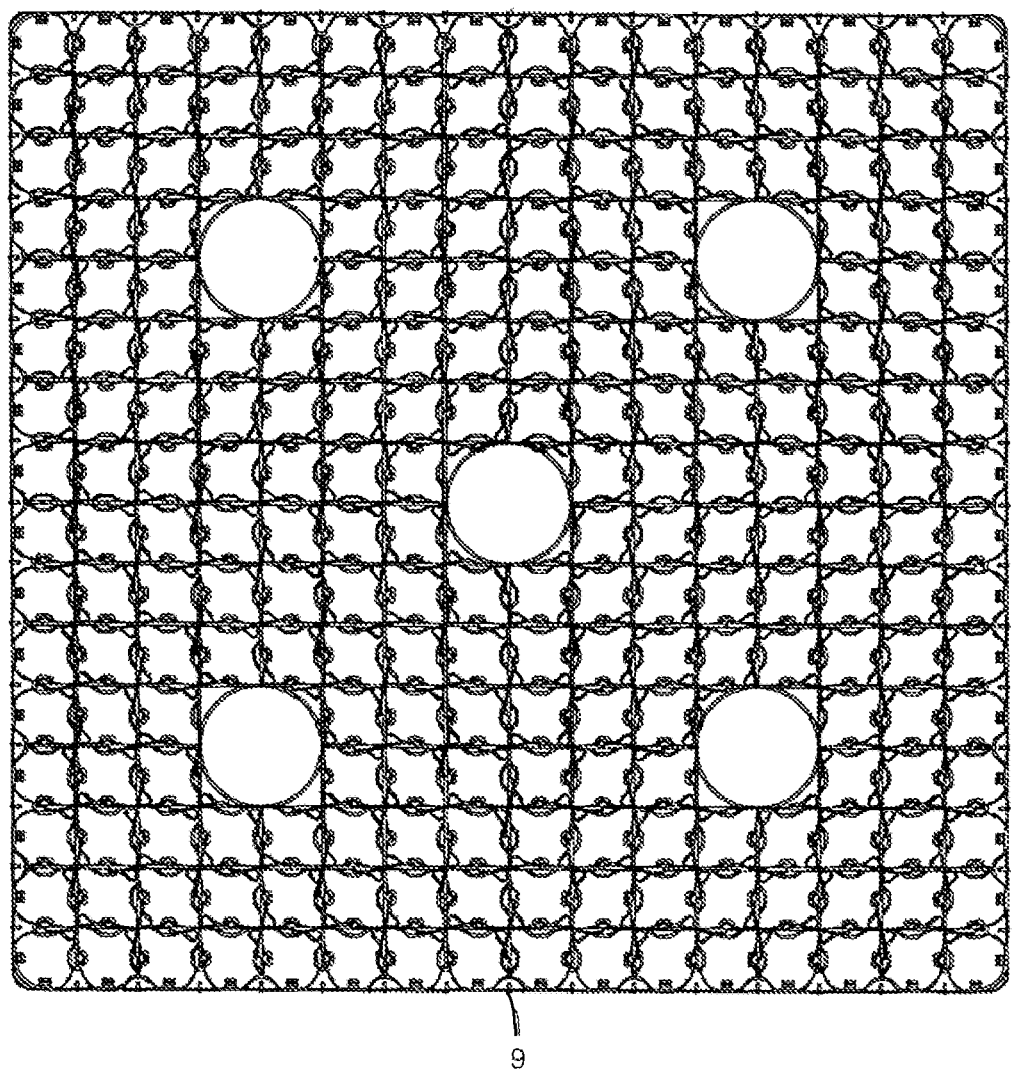
FIG. 6 is a plan view illustrating a spacer grid to which a mixing vane pattern according to the present invention is applied.

FIG. 6 is a plan view illustrating a spacer grid seen from above and FIG. 3 is an exploded perspective view illustrating a type of connection between a grid surface and a mixing vane in detail.

Referring to FIG. 6, the outline of the spacer grid has a rectangular shape with the same length. Referring to FIG. 3, the mixing vane 8 is integrated to inner strips, protruded to downstream of coolant on an upper end of the inner grid surface of the spacer grid and bent to a direction for surrounding the fuel rod.

The mixing vane 8 promotes heat transfer through mixing of coolant around the fuel rod.

In addition, referring to FIG. 6, it can be understood that the spacer grid is equipped with a plurality of mixing vanes inside the grid cell and positions and directions of the mixing vanes are formed in uniform patterns on a plan view of the spacer grid.

Figure 7:
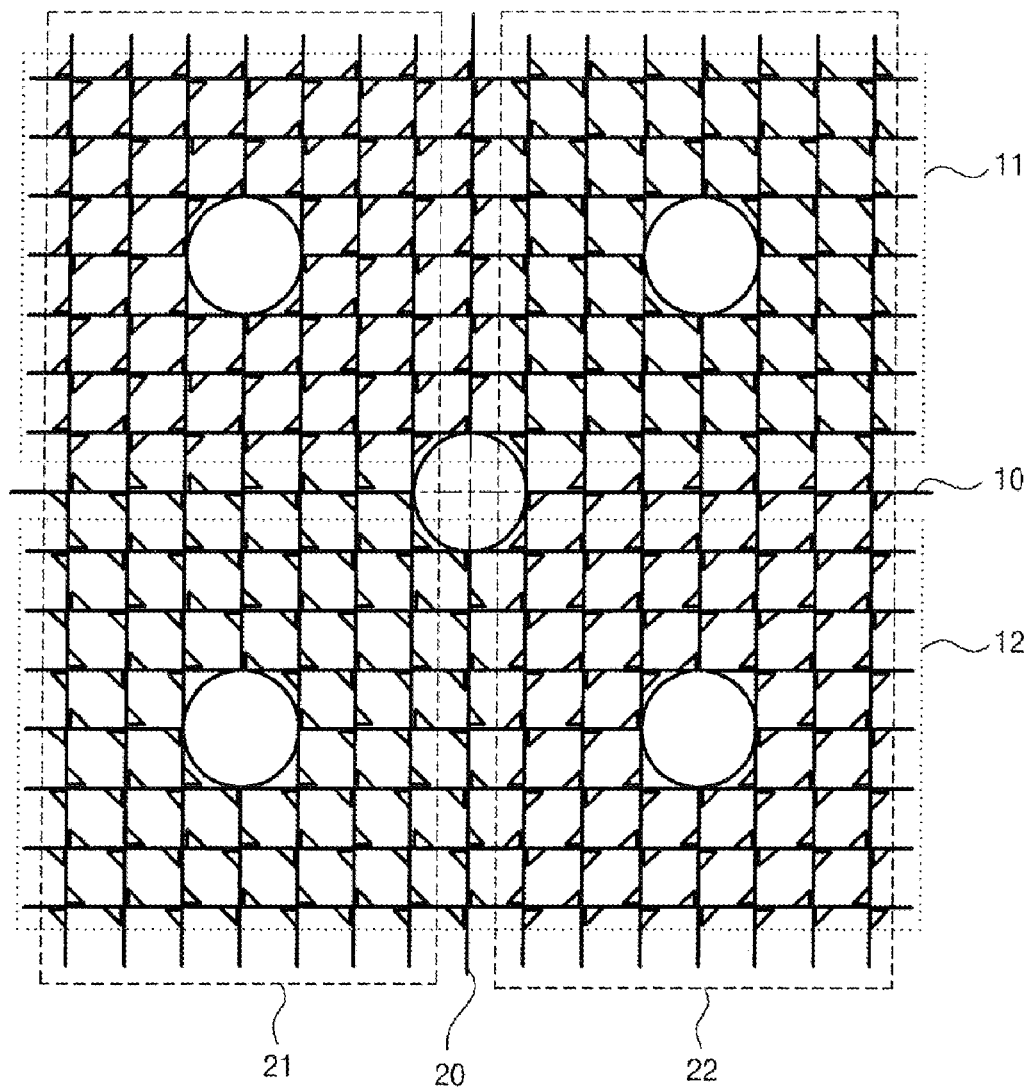
FIG. 7 is a plan view illustrating a desirable exemplary embodiment of the mixing vane pattern according to the present invention.

FIG. 7 illustrates an inner region except for an outer grid plate forming the outline of a shape 9 of the spacer grid shown in FIG. 6 to show uniform patterns of the mixing vanes specifically. Here, inner strips are displayed as a straight line and mixing vanes are displayed as a triangle.

FIG. 7 illustrates a desirable exemplary embodiment of the spacer grid with hydraulically balanced mixing vane patterns according to the present invention.

For convenience, it is defined as a vertical standard line 20 and a horizontal standard line 10, perpendicular to each other and passing the center of the spacer grid. The mixing vanes 8 are formed to make the arrangement of mixing vanes in left and right regions 21 and 22 symmetrical to each other with respect to the vertical standard line 20.

The mixing vanes 8 are formed to make the arrangement of mixing vanes 8 in upper and lower regions 11 and 12 symmetrical to each other, with respect to the horizontal standard line 10.

Moreover, the mixing vane 8 of the vertical standard line 20 is formed to have the same pattern as the left region 21 and the mixing vane 8 of the horizontal standard line 10 is formed to have the same pattern as the lower region 12.

Hereinafter, the operation employed by the exemplary embodiment of the present invention will be explained.

When coolant flows into the nuclear fuel assemblies inserted into the nuclear reactor axially, the mixing vanes equipped by the spacer grid are hydraulically loaded by coolant flowing around the mixing vanes.

The hydraulic load is reacted as a moment for rotating the spacer grid with respect to the center of the spacer grid. When the moment caused by the mixing vanes is unbalanced with respect to the center of the spacer grid, coolant induced vibration is generated in the spacer grid and thus it causes fretting wear to the fuel rod inserted into the spacer grid.

Accordingly, in the above explained exemplary embodiment of the present invention, it can minimize coolant flow induced vibration in the spacer grid due to hydraulic power balance around the center of the spacer grid, by forming the mixing vanes to be symmetrical to each of vertical and horizontal standard lines that pass the center of the spacer grid.

As described above, the spacer grid with hydraulically balanced mixing vane patterns according to the present invention produces the following effects.

The spacer grid is equipped with a plurality of mixing vanes that are protruded toward downstream of coolant on upper ends of inner surfaces of the spacer grid. Accordingly, it can maintain hydraulic balance of the spacer grid by forming the arrangement of positions and directions of mixing vanes in uniform patterns when facing an upper surface of the spacer grid, and by minimizing coolant flow induced vibration generated in the spacer grid.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. A spacer grid, comprising:
a plurality of strips forming a plurality of grid cells;
a plurality of fuel rods;
a plurality of springs supporting the fuel rods in predetermined directions on surfaces of the grid cells; and
a plurality of mixing vanes, each of the mixing vanes protruding from an upper end of an inner surface of the grid cells toward a downstream direction of coolant,
wherein the mixing vanes are arranged such that a pattern of mixing vanes within the left region of a vertical standard line is symmetrical to a pattern of the mixing vanes within the right region of the vertical standard line, and a pattern of the mixing vanes within the upper region of a horizontal standard line is symmetrical to a pattern of the mixing vanes within the lower region of the horizontal standard line,
wherein the vertical standard line is defined by a vertical line passing through a centerpoint of the plurality of grid cells, and the horizontal standard line is defined by a horizontal line passing through said centerpoint, and
wherein a pattern of the mixing vanes arranged on the vertical standard line is the same as the pattern of the mixing vanes within the left region of the vertical standard line, and a pattern of the mixing vanes arranged on the horizontal standard line is the same as the pattern of the mixing vanes within the lower region of the horizontal standard line.

* * * * *